United States Patent [19]

Nara et al.

[11] Patent Number: 4,761,779
[45] Date of Patent: Aug. 2, 1988

[54] SUBSCRIBER'S LINE SWITCHING CONTROL SYSTEM

[75] Inventors: Takashi Nara; Hiroaki Takeichi; Yoshio Morita, all of Yokohama; Takashi Hatano, Machida; Yutaka Kawato, Tokyo, all of Japan

[73] Assignee: Fujitsu Limited, Kawasaki, Japan

[21] Appl. No.: 932,621

[22] Filed: Nov. 20, 1986

[30] Foreign Application Priority Data

Nov. 28, 1985 [JP] Japan ................... 60-266072

[51] Int. Cl.⁴ .............................................. H04J 3/12
[52] U.S. Cl. ...................................... 370/58; 370/60;
370/68.1
[58] Field of Search ............... 370/58, 60, 68.1, 110.1

[56] References Cited

U.S. PATENT DOCUMENTS 4,627,047 12/1986 Pitroda et al. .................. 370/58
4,644,527 2/1987 Anderson et al. ............... 370/58
4,692,917 9/1987 Fujioka .......................... 370/60

Primary Examiner—Douglas W. Olms
Assistant Examiner—Min Jung
Attorney, Agent, or Firm—Staas & Halsey

[57] ABSTRACT

In this invention, a call control information of a subscriber's line is compiled into a packet form, is transferred via a network of a digital switch board to a signal control device, and digital data is also transferred via the network to a handler. Accordingly, a signal from a digital subscriber is efficiently processed, and an analog subscriber is also accommodated so that a call control in the same way as for the digital subscriber is made possible for the analog subscriber.

5 Claims, 6 Drawing Sheets $B_1(64kb/s) + B_2(64kb/s) + D(16kb/s)$

B CHANNEL: HIGH SPEED DATA INCLUDING VOICE INFORMATION ETC

D CHANNEL: LOW SPEED INFORMATION AND CALL CONTROL INFORMATION (PACKET)

F | FCS | INFORMATION | C | A | F

TRANSMITTING ORDER

1

SUBSCRIBER'S LINE SWITCHING CONTROL SYSTEM

BACKGROUND OF THE INVENTION

1. Field of the Invention

The present invention relates to a subscriber's line switching control system in which, in a digital switching system accommodating a subscriber's line, an efficient switching control can be carried out for both a digital subscriber's line and an analog subscriber's line.

2. Description of the Related Art

An analog subscriber's line is usually used as a subscriber's line accommodated in a digital switching system, but because of developments in digital techniques, a digital subscriber's line is also used therein, as disclosed in U.S. Pat. No. 4,571,721. In this disclosure, the analog subscriber's line and the digital subscriber's line are combined, and thus a satisfactory interface is required.

In a remote line concentrator having a construction in which the digital subscriber's line and the analog subscriber's line are accommodated, a concentrator stage of a part of a master office is set at a remote location, and a connection control is carried out in accordance with switching connection control information from the master office, to process the digital signal in the same way as in a digital switching system.

The interface between the digital subscriber and the switching system is prescribed by the CCITT (International Telegraph and Telephone Consultative Committee), and therein it is specified that the call control information which controls the low speed digital data and the call information, etc., via the digital subscriber's line from the digital subscriber is sent on the D channel (16 kb/s), and a high speed data including voice information, etc., is sent on the B channel (64 kb/s). In the subscriber's line, the D channel and the B channel are separated, and the data in the D channel is transferred to a D channel handler.

In such a remote line concentrator, the call control information for analog subscribers is received via a scan/signal separator, and the call control information for digital subscribers is received via the D channel handler. Therefore, there is a drawback in that the construction becomes complex because the interfaces of the call control information are different for analog subscribers and digital subscribers.

Further, the D channel handler for digital subscribers and the scan/signal separator for analog subscribers are centralized, which requires comparatively large scale circuitry to provide capacity for many of each type of subscriber. Also, to allow the ratio between digital subscribers and analog subscribers to change the total capacity of the D channel handler and the scan/signal distributor must be greater than the total number of subscribers which is uneconomical.

SUMMARY OF THE INVENTION

An object of the present invention is to provide a subscriber's line switching control system having a substantially similar interface condition for both the digital subscriber and the analog subscriber, so as to simplify the construction.

Another object of the present invention is to provide a subscriber's line switching control system having an economical construction, even if the ratio between the digital subscriber and the analog subscriber changes.

For achieving the above-mentioned object, in the present invention, a subscriber's line switching control system comprises a network of a digital switching system which accommodates via a subscriber's line interfacer one or both of a digital subscriber's line and an analog subscriber's line; a packet handler which is connected directly to the network and to a signal control device via the network, or which is provided in another office; and a processor which controls the network according to control information from the signal control device.

Call control information is compiled into a packet form in the subscriber's line interfacer, the call control information converted to the packet form is transferred via the network to the signal control device, and digital data via the digital subscriber's line is converted via the network to the packet handler.

Further features and advantages of the present invention will be apparent from the ensuing description with reference to the accompanying drawings to which, however, the scope of the invention is in no way limited.

DESCRIPTION OF THE PREFERRED EMBODIMENT

Figure 1:
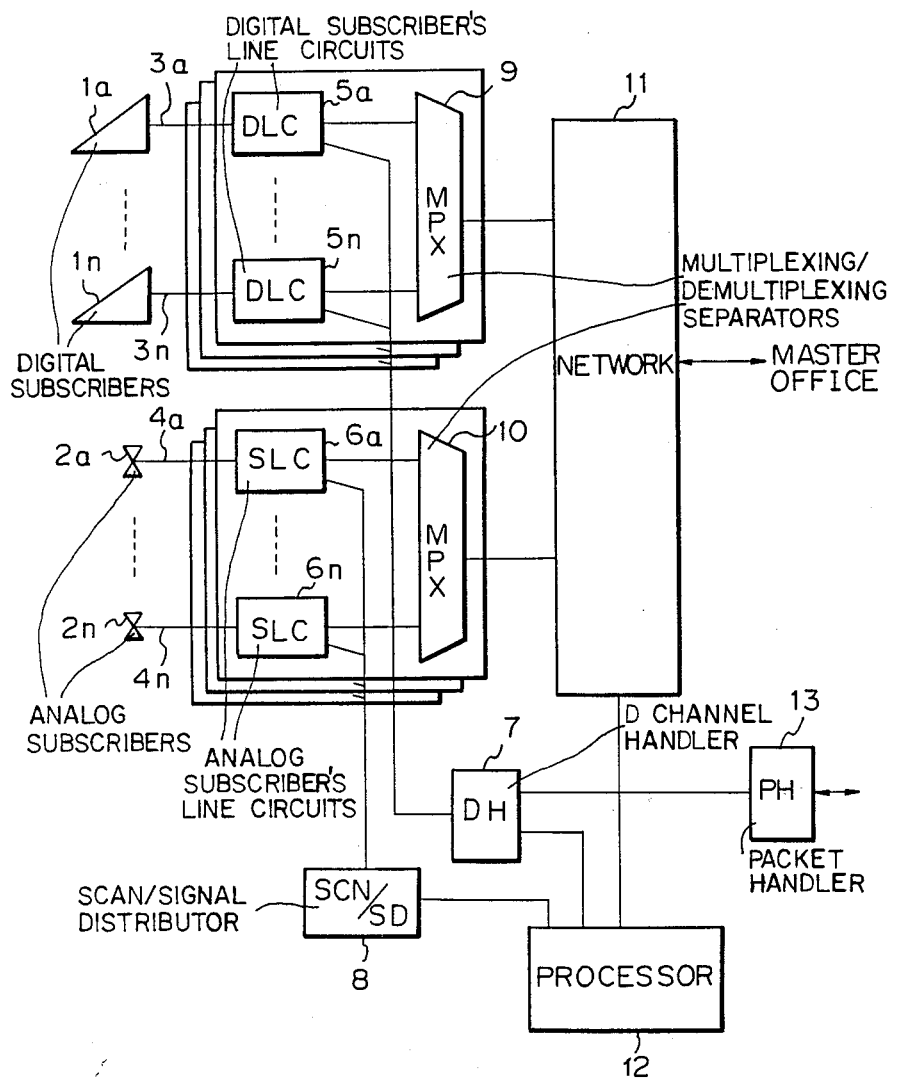
FIG. 1 shows a block diagram of one example of a conventional remote line concentrator in which a digital subscriber's line and an analog subscriber's line are accommodated.

A conventional remote line concentrator in which the digital subscriber's line and the analog subscriber's line are accommodated has, for example, a construction as shown in FIG. 1. In FIG. 1, $1a \sim 1n$ are digital subscribers, $2a \sim 2n$ are analog subscribers, $3a \sim 3n$ are digital subscriber's lines, $4a \sim 4n$ are analog subscriber's lines, $5a \sim 5n$ are digital subscriber's line circuits (DLC), $6a \sim 6n$ are analog subscriber's line circuits (SLC), 7 is a D channel handler (DH), 8 is a scan/signal distributor (SCN/SD), 9 and 10 are multiplexing/demultiplexing separators (MPX), 11 is a network (NW), 12 is a processor, and 13 is a packet handler (PH).

In this construction of the remote line, a concentrator stage of a part of a master office (not shown in the drawing) is set in a remote place, and a connection control is carried out in accordance with switching connection control information from the master office so that the network 11 processes the digital signals in the same way as in a digital switching system.

Figure 2A:
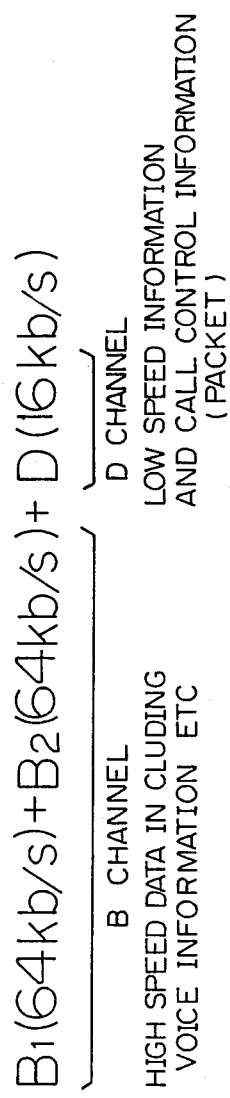
FIGS. 2A and 2B show a formation of a digital subscriber's line and a format of D channel data prescribed by the CCITT.

An interface between the digital subscriber and the switching system is, as shown in FIG. 2A, prescribed by the CCITT, and it is specified therein that the call control information which controls the low speed digital data and the call information, etc., via the digital subscriber's line $3a \sim 3n$ from the digital subscriber $1a \sim 1n$ is sent on the D channel (16 kb/s), and high speed data including voice information, etc., is sent on the B channel (64 kb/s). In the digital subscriber's line circuit $5a \sim 5n$, the D channel and the B channel are separated, and the data on the D channel is transferred to the D channel handler 7.

The data on the B channel is multiplexed in the multiplexing/demultiplexing device 9, and is sent via the network 11 to the master office (not shown in the drawing). The data received from the master office is passed through the network 11 and separated in the multiplexing/demultiplexing device 9, and is sent via the digital subscriber's line circuits $5a \sim 5n$ to the predetermined subscriber $1a \sim 1n$.

In the D channel handler 7, the digital data and the call information compiled into packet form are separated, and accordingly, the separated call control information is transferred to the processor 12, and the digital data is transferred to the packet handler 13. The packet handler 13 outputs the digital data via the packet switchboard, etc. The processor 12 is used to control the call control information in the network 11. The D channel handler 7 is commonly used for all of the digital subscriber's line circuits $5a \sim 5n$ even in a construction having a plurality of multiplexing/demultiplexing devices 9.

The information concerning an on-hook and off-hook, etc., by the subscriber $2a \sim 2n$ is transferred to the processor 12 by scanning and detecting signals in the analog subscriber's line circuits $6a \sim 6n$ by the scan/signal distributor 8, and the processor 12 controls the network 11 accordingly. The analog voice signal is converted to a digital signal by the analog subscriber's circuits $6a \sim 6n$, is multiplexed by the multiplexing/demultiplexing device 10, and is sent via the network 11 to the master office.

The digital voice signal from the master office is separated via the network 11 in the multiplexing/demultiplexing device 10, is converted to an analog voice signal in the analog subscriber's line circuits $6a \sim 6n$, and is sent to the analog subscriber. In this case, the scan/signal separator 8 is commonly used, even if a plurality of the multiplexing/demultiplexing devices 10 are used.

In the processor 12, the call control information from the analog subscriber is received via the scan/signal separator 8 and the call control information from the digital subscriber is received via the D channel handler 7. Therefore, it has a drawback in that the construction becomes complex because the interfaces of the call control information are different in the analog subscriber and the digital subscriber.

Further, the D channel handler 7 and the scan/signal separator 8 are centralized, so that the construction becomes comparatively large scale. Then, when the ratio between the digital subscriber and the analog subscriber changes, a drawback arises in that the D channel handler 7 or the scan/signal distributor 8 becomes uneconomical.

Figure 3:
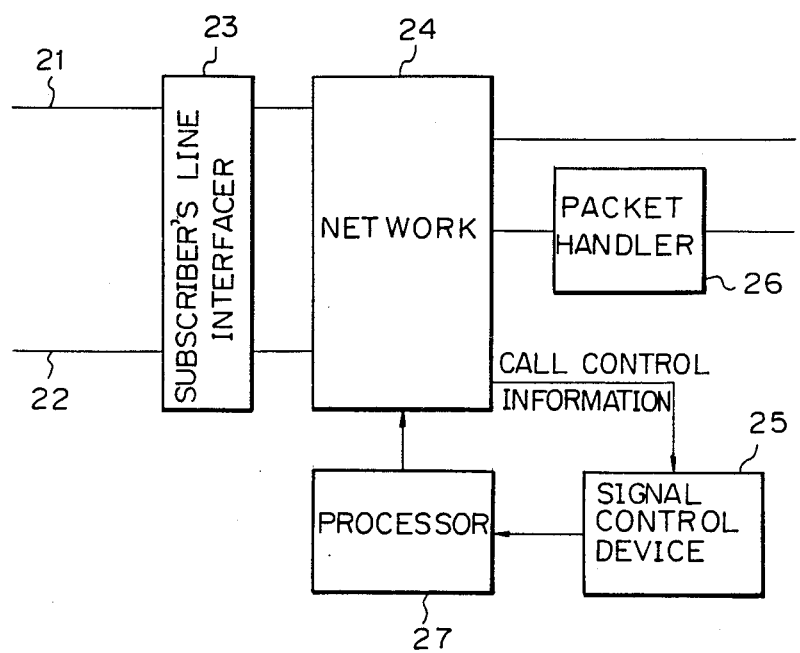
FIG. 3 is a block diagram showing a principle of the present invention.

In the subscriber's line switching control system of the present invention, the call control information and the digital data in the D channel are transferred via the network. This will be explained with reference to FIG. 3. In FIG. 3, the digital subscriber's line 21 and the analog subscriber's line 22 are connected to the network 24 of the digital switchboard via the subscriber's line interfacer 23 including the subscriber's line circuits or the multiplexing/demultiplexing device, etc. The call control information from the subscriber is compiled into packet form in the subscriber's line interfacer 23, and the call control information in the packet form is transferred via the network 24 to the signal control device 25, and thus the processor 27 controls the network 24 in accordance with the control information from the signal control device 25. Further, the digital data via the digital subscriber's line 21 is transferred to the packet handler 26 directly connected to the network 24, or to a packet handler provided in another office.

The call control information from the digital subscriber and the analog subscriber is compiled into packet form in the subscriber's line interfacer 23, and transferred via the network 24 to the signal control device 25, so that similar processes can be carried out for the digital subscriber's line 21 and the analog subscriber's line 22. As the digital data in the form of packet data is also transferred via the network 24, if a packet handler 26 is set in another office, such as the master office, etc., the digital data can be transferred thereto.

Figure 4:
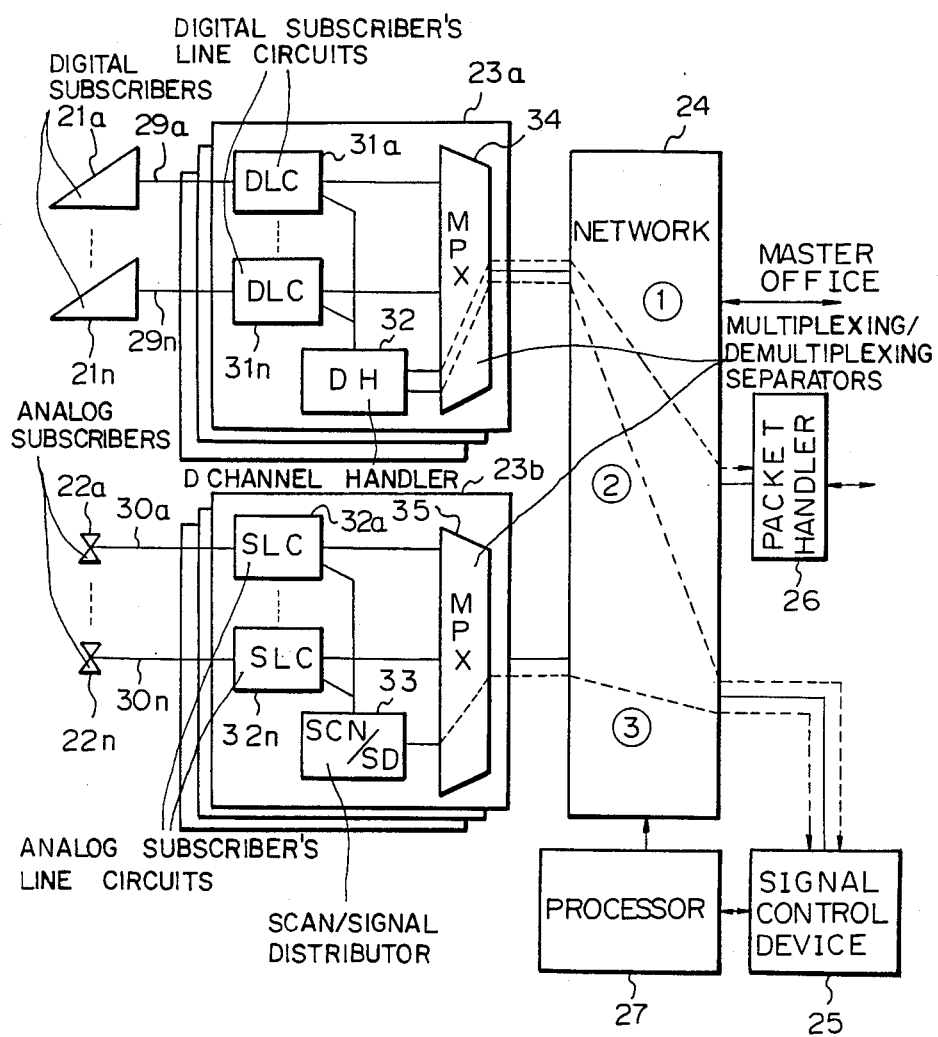
FIG. 4 is a block diagram of one embodiment of a remote line concentrator in which a digital subscriber's line and an analog subscriber's line are accommodated.

FIG. 4 is a block diagram of the embodiment of the present invention, and shows the present invention when applied to the remote line concentrator as in the prior art shown in FIG. 1. In FIG. 4, $21a \sim 21n$ are digital subscribers, $22a \sim 22n$ are analog subscribers, $29a \sim 29n$ are digital subscriber's lines, $30a \sim 30n$ are analog subscriber's lines, $31a \sim 31n$ are digital subscriber's line circuits (DLC), $32a \sim 32n$ are analog subscriber's line circuits (SLC), 32 is a D channel handler (DH), 33 is a scan/signal distributor (SCN/SD), 34, 35 are multiplexing/demultiplexing separators (MPX), 24 is a network (NW), 27 is a processor which controls the network and other portions, 26 is a packet handler (PH), and 25 is a signal control device (SIG).

The D channel handler 32 is provided for each multiplexing/demultiplexing device 34, and the scan and signal distributor 33 is provided for each multiplexing/demultiplexing device 35. The multiplexing/demultiplexing devices 34, 35 each carry out the multiplexing and the demultiplexing for, for example, 60 subscribers. Therefore, when the number of digital subscribers 21 or analog subscribers 22 is more than 60, additional multiplexing and demultiplexing device 34, 35 are provided at every integral number of 60, and accordingly, a D channel handler 32 or the scan/signal distributor 33 is provided for each additional multiplexing/demultiplexing device.

The D channel, which is transferred from the digital subscriber 21 via the digital subscriber's line 29 to the digital subscriber's line circuit 31 and is separated in the digital subscriber's line circuit 31, is transferred to the D channel handler 32. The call control information is separated in this D channel handler 32 and transferred from the multiplexing/demultiplexing device 34 via a path ② shown by the broken line in the network 24 to the signal control circuit 25, and the call control information is then transferred from the signal control device 25 to the processor 27, so that control of the network 24 is carried out. For example, a path ① in the network 24 is formed by the call control information of the call, and the digital data separated in the D channel handler 32 is transferred from the multiplexing/demultiplexing device 34 via the path ① shown by broken line in the network 24 to the packet handler 26.

The data of the B channel is sent from the digital subscriber's circuit 31 via the multiplexing/demultiplexing device 34 and the network 24 to the master office. The data of the B channel from the master office side is supplied via the network 24 to the multiplexing/demultiplexing device 34, where it is separated and synthesized with the data of the D channel in the digital subscriber's line circuit 31, and then transferred via the digital subscriber's line 29 to the digital subscriber 21. As a result, communication between the digital subscribers is established.

The analog subscriber's line circuit 32 is scanned in the scan/signal distributor 33, the call control information of the analog subscriber is detected, the detected call control information is compiled as the packet form and is multiplexed in the multiplexing/demultiplexing device 35, and is then transferred via the path ③ shown by broken line to the signal control circuit 25. The control information is sent from this signal control circuit 25 to the processor 27 to control the network 24, and then the line concentrating connection for the master office is carried out by the network 24. Subsequently, the voice information from the analog subscriber 22 is converted to a digital signal in the analog subscriber's line circuit 32 and is sent from the multiplexing/demultiplexing device 35 via the network 24 to the master office. Conversely, the digital voice information from the master office is supplied via the network 24 to the multiplexing/demultiplexing device 35 to be demultiplexed, converted to an analog signal in the analog subscriber's line circuit 32 and transferred to the analog subscriber 22, and thus communication between the subscribers is established.

The signal control device 25 or the packet handler 26, etc., may be included at the side of the multiplexing-/demultiplexing device 34, 35 in the network 24, and the connection between the subscribers connected in the network 24 can be simply controlled by analyzing the dial information in the processor 27.

Figure 2B:
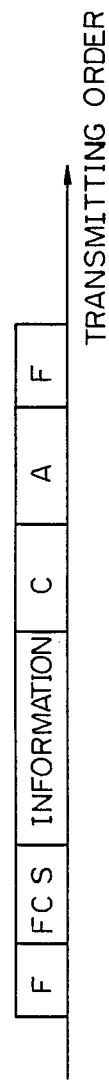

Next, the D channel handler 32 and the signal control device 25 will be described in detail. Before that explanation, however, reference is made to the D channel data format shown in FIG. 2B. This format is prescribed in Q921 of the CCITT. In FIG. 2B, F denotes a flag which is fixed binary pattern of 01111110;

A denotes an address field;

C denotes a controlled field which contains a sequence number for error recovery and includes N(S) denoting a transmitter send sequence number;

N(R) denoting a transmitter receive sequence number; and

FCS denotes a frame check sequence generated by a polynomial $X^{15}+X^{12}+X^5+1$.

This is as prescribed in Q921 of the CCITT.

Figure 5:
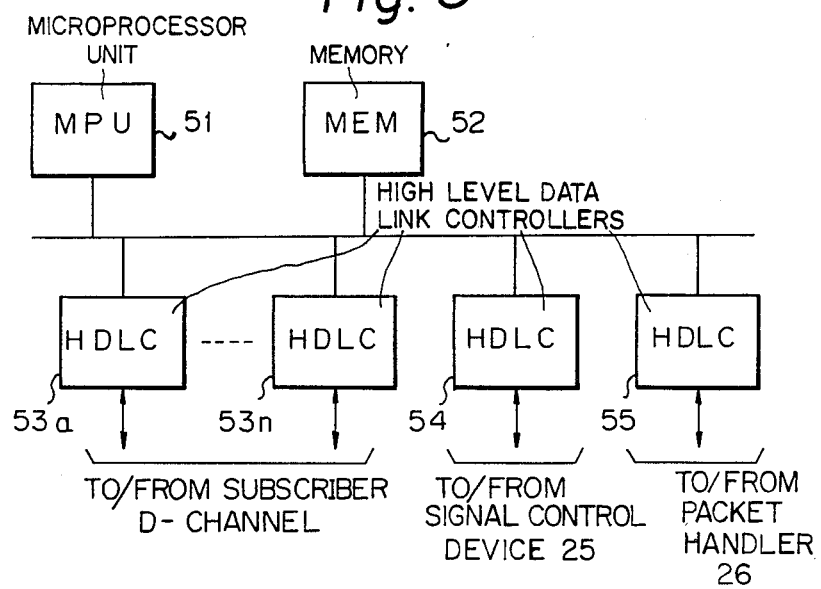
FIG. 5 is a block diagram of one embodiment of D channel handler shown in FIG. 4.

FIG. 5 is a block diagram of the D channel handler. In FIG. 5, 51 is a microprocessor unit (MPU), 52 is a memory (MEM), and $53a \sim 53n$, 54, 55 are high level data link controllers (HDLC).

When the D channel handler receives the D-channel data from the subscriber's line, the D-channel data (16 k bit/s) is input to the high level data link controllers $53a \sim 53n$. The hardware included in the high level data link controller $53a \sim 53n$ detects the flag F shown in FIG. 2B and carries out the delimitation of the message unit and checks by using the FCS in the format, and only residual A and C fields and the information are transferred to the memory 52.

The microprocessor 51 reads the received data and carries out the following process.

(a) In the A-field, there is an identifier of whether it is signalling information or user packet, and the microprocessor unit discriminates which kind it is by that identifier.

If it is signalling information, a further process on the sequence number included in the C-field is made by a D-channel protocol (LAPD: link access procedure D). When it is a normal signal, it is accepted and the content of the information is sent to the signal control device 25 (SIG).

If it is a user packet, it is transferred to the packet handler 26 (PH).

(b) The content of the information sent to the signal control device 25 is added by the processing of the microprocessor unit 51 of the A, C field based on the protocol transferred between the D-channel handler and the signal control device, and it is transferred to the high level data link controller 54. (Flag and FCS are added in the controller 54 and sent to the signal control device 25.)

(c) With respect to the packet transferred to the packet handler 25, only the A-field is converted and transferred to the controller 55. The flag and FCS is added to the A-field and is sent to the packet handler 26.

The processing of the data received from the signal control device or the packet handler is carried out is the reverse of that shown above.

Figure 6:
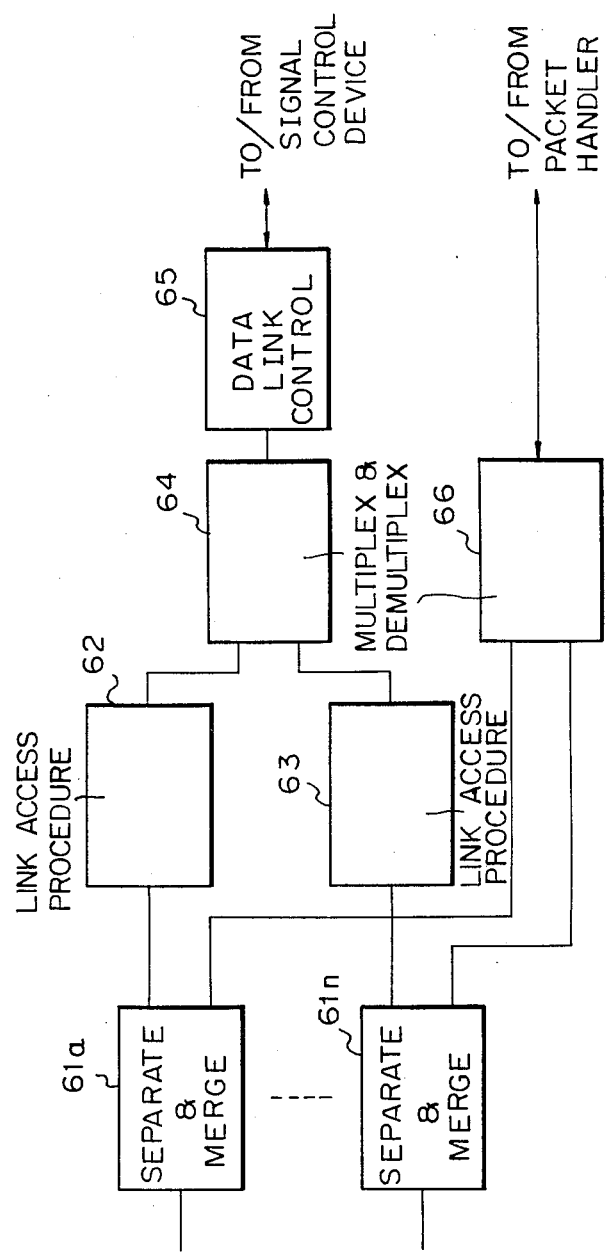
FIG. 6 is a diagram explaining a function of the D channel handler shown in FIG. 5.

The above-mentioned function is graphically shown in FIG. 6.

In FIG. 6, when the data is received from the subscriber, the signalling information and the user packet are separated in the blocks $61a \sim 61n$, and are merged when the data is sent to the subscriber. In the LAPD process 62, 63, the data received or sent by the subscriber is data link controlled based on the D-channel link access procedure (LAPD). In the data link control 65, the error recovery process based on the data link control protocol between the signal control device and the D-channel handler is carried out. In practice, a process similar to the LAPD process is used.

Figure 7:
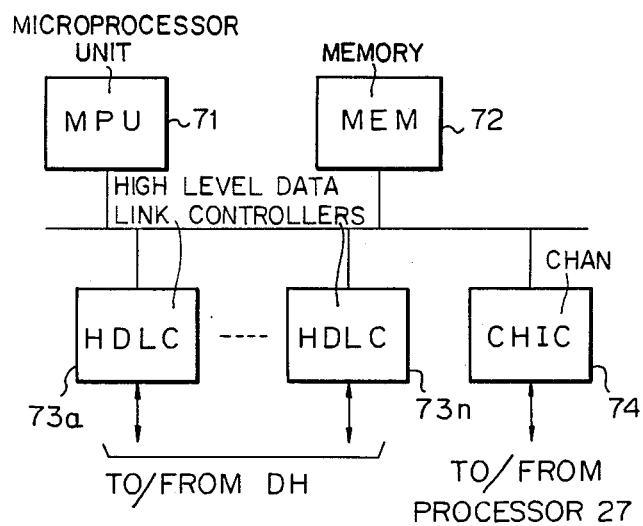
FIG. 7 is a block diagram of one embodiment of a signal control device shown in FIG. 4.

FIG. 7 is a diagram showing the signal control device. In FIG. 7, 71 is a microprocessor unit (MPU), 72 is a memory (MEM), $73a \sim 73n$ are high level data link controllers (HDLC), and 74 is a channel interface controller (CHIC).

In FIG. 7, when the data received from the D channel handler is processed, the data from the D channel handler is input to the controllers $73a \sim 73n$, the process explained in the description of FIG. 5 is carried out, and the content of the processed information is transferred via the channel interface controller 74 to the processor 25. When the data is received at the processor 25, a process that is, the reverse of that described above is carried out.

The above embodiment is described in the case when the present invention is applied to the line concentrator, but the present invention can be applied also to a terminal office in which the subscriber's line is connected. Further, this embodiment shows the case when the packet handler 26 is directly connected in the network 24, but it is possible to set the packet handler in another office such as the master office, etc. That is, there is no restriction of the position at which the packet handler 26 is set.

As mentioned above, in the present invention, the call control information of the subscriber is compiled in packet form in the subscriber line interfacer 23, and this call control information is transferred via the network 24 to the signal control circuit 25. The digital data via the digital subscriber's line 21 is transferred via the network 24 to the packet handler 26. Therefore, both the call control information of the digital subscriber and the call control information of the analog subscriber, which are compiled in packet form, are transferred to the signal control circuit 25, and therefore, the same control can be carried out for the digital subscriber and for the analog subscriber from the processor 27.

Further, compared to the prior art, the number of cables for transferring the call control information is decreased, and therefore an economical construction can be obtained. Further, the position at which the packet handler 26 is set is not restricted, and when the present invention is applied to a remote line concentrator device, etc., the packet data may be transferred to the master office via the network 24, and therefore the construction can be made more economical.

Further, the D channel handler 32 and the scan/signal distributor 33 are provided for the multiplexing/demultiplexing devices 34, 35, to attain a distributed control construction, and therefore, when the inclusion ratio for the digital subscriber and the analog subscriber is changed, a flexible response can be realized.

What is claimed is:

1. A subscriber's line switching control system responsive to control information from a signal control device, comprising:
    a network of a digital switching system, operatively connected to the signal control device, accommodating, via a subscriber's line interfacer, at least one of a digital subscriber's line and an analog subscriber's line;
    a packet handler connected directly to said network and via said network to the signal control device; and
    a processor, operatively connected to said network and the signal control device, for controlling said network according to the control information from the signal control device to compile call control information into a packet form in said subscriber's line interfacer, the call control information being transferred in said packet form via said network to said signal control device, and digital data from the digital subscriber's line being transferred via said network to said packet handler.

2. A subscriber's line switching control system according to claim 1, wherein
    said subscriber's line interfacer comprises:
    a plurality of digital subscriber's line circuits connected via digital subscriber's lines to digital subscribers to transmit signals over at least a D channel,
    a first multiplexing/demultiplexing separator connected to said digital subscriber's line circuits,
    a D channel handler provided corresponding to said first multiplexing/demultiplexing separator,
    a plurality of analog subscriber's line circuits connected via analog subscriber's lines to analog subscribers,
    a second multiplexing/demultiplexing separator connected to said analog subscriber's line circuits, and
    a scan/signal distributor provided corresponding to said second multiplexing/demultiplexing separator,
    said digital subscriber's line circuits separating the signals transmitted over the D channel from other of the signals transmitted via said digital subscriber lines, the signals transmitted over the D channel being transferred to said D channel handler where the call control information is separated from digital data in the signals transmitted over the D channel, the call control information being transferred from said D channel handler via said first multiplexing/demultiplexing separator and said network to said signal control device, the digital data remaining in said D channel handler being transferred via said first multiplexing/demultiplexing separator to said packet handler, and
    said scan/signal distributor scanning said analog distributor circuits, detecting the call control information of said analog subscribers, the detected call information being complied into packet form, multiplexed, and transferred via said second multiplexing/demultiplexing separator and said network to said signal control device.

3. A subscriber's line switching control system according to claim 2, wherein
    said D channel handler comprises:
    a first high level data link controller connected to said digital subscriber's line circuits,
    a second high level data link controller connected to the signal control device,
    a third high level data link controller connected to said packet handler,
    a microprocessor unit connected to said first, second and third high level data link controllers, and
    a memory connected to said microprocessor unit and said first, second and third high level data link controllers,
    wherein information in the signals transmitted over the D-channel and received from said digital subscriber's line circuits is stored in said first high level data link controller and said first high level data link controller transfers the information from the D channel to said memory, whereby said microprocessor reads the information transferred to said memory, said microprocessor transferring the information to the signal control device, if the information is signalling information, and otherwise transferring the information to said packet handler, and
    when reverse data is received from one of said signal control device and said packet handler, a reverse operation to the described above is carried out.

4. A subscriber's line switching control system according to claim 1, wherein said signal control device comprises:
    a microprocessor unit,
    a memory operatively connected to said microprocessor unit,
    a high level data link controller operatively connected to said D channel handler, said microprocessor unit and said memory, and
    a channel interface controller operatively connected to said processor, said microprocessor unit and said memory, and
    when data is received from said D channel handler, the data is stored in said high level data link controller, said high level data link controller transfers information included in the data to said memory, said microprocessor reads the information and transfers the information via said channel interface controller to said processor, and when reverse data is received from said processor, a reverse operation to that described above is carried out.

5. A digital switching system for transmitting signals between analog and digital subscribers, comprising:

analog subscriber's lines operatively connected to the analog subscribers;

digital subscriber's lines operatively connected to the digital subscribers for transmitting digital data;

a subscriber's line interfacer, operatively connected to said analog and digital subscriber's lines;

a digital switching network, operatively connected to said subscriber's line interfacer for switching signals, including the digital data, between the analog and digital subscribers;

a packet handler directly connected to said digital switching network for handling data in packet for;

a signal control device for generating controlled information controlling said digital switching system; and a processor, operatively connected to said digital switching network and said signal control device, for controlling said network according to the control information from said signal control device to compile called control information into packet form in said subscriber's line interfacer, the call control information being transferred in the packet form via said digital switching network to said signal control device and digital data from said digital subscriber's lines being transferred via said digital switching network to said packet handler.

* * * * *

UNITED STATES PATENT AND TRADEMARK OFFICE
CERTIFICATE OF CORRECTION

PATENT NO. : 4,761,779

DATED : August 2, 1988

INVENTOR(S) : Nara et al.

It is certified that error appears in the above-identified patent and that said Letters Patent is hereby corrected as shown below:

Col. 1, line 56, "change" should be --change,--.

Col. 3, line 28, "5a $\sim$ 5n" should be --5a $\sim$ $5n_1$--;

Col. 8, line 18, "complied" should be --compiled--;
       line 51, "the" should be --that--.

Col. 9, lines 7, 9 and 12, "subscriber's" should be --subscribers'--.

Col. 10, line 15, "subscriber's" should be --subscribers'--.

Signed and Sealed this

Fourteenth Day of March, 1989

Attest:

DONALD J. QUIGG

*Attesting Officer*      *Commissioner of Patents and Trademarks*